US006628294B1

United States Patent
Sadowsky et al.

(10) Patent No.: US 6,628,294 B1
(45) Date of Patent: Sep. 30, 2003

(54) PREFETCHING OF VIRTUAL-TO-PHYSICAL ADDRESS TRANSLATION FOR DISPLAY DATA

(75) Inventors: Jonathan B. Sadowsky, El Dorado Hills, CA (US); Aditya Sreenivas, Eldorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,983

(22) Filed: Dec. 31, 1999

(51) Int. Cl.[7] .............................................. G06F 12/10
(52) U.S. Cl. ...................... 345/568; 345/539; 711/206
(58) Field of Search ................................ 345/568, 539, 345/564, 536, 501, 530, 531; 711/202–208

(56) References Cited

U.S. PATENT DOCUMENTS

| | | | |
|---|---|---|---|
| 5,349,651 A | 9/1994 | Hetherington et al. ...... 395/400 |
| 5,737,747 A | 4/1998 | Vishlitzky et al. ........... 711/118 |
| 5,802,566 A | 9/1998 | Hagersten ................... 711/137 |
| 5,835,967 A | 11/1998 | McMahan ................... 711/213 |
| 5,854,911 A | 12/1998 | Watkins ....................... 395/383 |
| 5,860,150 A | 1/1999 | Chiarot et al. .............. 711/213 |
| 5,944,801 A | 8/1999 | Gulick ......................... 710/29 |
| 5,990,912 A * | 11/1999 | Swanson ...................... 345/531 |
| 6,072,507 A * | 6/2000 | Balatsos et al. ............. 345/568 |
| 6,138,225 A * | 10/2000 | Upton et al. ................. 711/207 |
| 6,175,898 B1 * | 1/2001 | Ahmed et al. ............... 711/207 |
| 6,205,531 B1 * | 3/2001 | Hussain ....................... 345/564 |

* cited by examiner

Primary Examiner—Kee M. Tung
(74) Attorney, Agent, or Firm—Blakely, Sokoloff, Taylor & Zafman LLP

(57) ABSTRACT

An embodiment of the invention is directed to a method including fetching address translations for a current group of scanlines of image data and prefetching address translations for a next group of scanlines of image data. The prefetching occurs while the current group of scanlines of image data is being rendered on a display. The current group of scanlines and the next group of scanlines may be the same size such that determining address translations for the next group of scanlines terminates at or before the time the current group of scanlines have been rendered on the display. A translation look aside buffer (TLB) controller may be used to implement the method. In a particular embodiment of the invention, a first buffer and a second buffer are used such that when one stores address translations for the current group of scanlines of image data, the other stores address translations for the next group of scanlines of image data.

28 Claims, 8 Drawing Sheets

PREFETCHING OF VIRTUAL-TO-PHYSICAL ADDRESS TRANSLATION FOR DISPLAY DATA

FIELD OF THE INVENTION

The invention relates to memory address formation in computers and digital processing systems, and more specifically, to translating virtually addressed display data.

BACKGROUND INFORMATION

Electronic products may be thought of as those products that involve the controlled conduction of electrons or other charge carriers, especially through microprocessors. Examples of electronic products include televisions, computers, work stations, and servers as well as those involved in high-end networking and storage technology. Just about all electronic products employ one or more microprocessors disposed within the platform of a chip located on a printed circuit board. These microprocessors engage a computer operating system as well as applications. The central processing unit within the platform interacts with a memory controller to run the computer operating system and the applications.

A monitor may be viewed as a device connected to an electronic product's video output that permits a user to interact with the central processing unit through visual images. The visual images that are presented on a computer monitor to a computer user generally include display streams of data and overlay streams of data. An electronic gun may be swept rapidly back and forth across the screen of a monitor to activate individual pixels of the screen according to the data stream. This data is known to the engine of the electronic gun at its virtual memory address but is stored in the physical memory of the platform at a physical memory address.

To make use of this data, the platform operating system employs a Memory Management Unit (MMU) during its startup sequence to translate virtual addresses into physical addresses and store that translation in buffers of a translation table. A Translation Look-aside Buffer (TLB) as used in a virtual memory system may be viewed as including a table that lists the physical address page number associated with each virtual address page number. The TLB may also store each translation to a cache with tags that are based on virtual addresses. The virtual address may be presented simultaneously to the TLB and to the cache so that cache access and the virtual-to-physical address translation can proceed in parallel (the translation is done "on the side").

When a request for data located at a physical address arrives in the TLB from a graphics engine, the request is described by its virtual address. Based on the request, the TLB accesses either the stored or cached virtual to physical address translation. If the requested address is not cached, the TLB controller fetches the new translation from memory such that the physical memory address may be used to locate the data in main memory.

Latency is the time from when a display engine requests data from a streamer until the display engine receives the data and displays it on a monitor. It takes a period of time to request and receive the translation and then to fetch and receive the physical data. For video display streams (referred to as isochronous data streams) employing display and overlay streamers, there is a strict time requirement within which the display engine must receive the requested data. Translation fetch in response to a data request adds time to the graphic display process. A problem of adding time to the graphic display process is that if the data does not arrive by the time the electronic gun is at a pixel located at a position on the monitor, the electronic gun will not properly update the pixel, so that image corruption such as screen tearing results.

One technique to account for the latency is to increase the buffer space inside the chip. This increases the number of virtual to physical translations that may be performed during the startup sequence. Although this reduces the time from when the request is initially made for data by the engine to the time that the data is needed by the engine, this increases the gate count so as to require a bigger die. This, in turn, increases the cost of the chip.

SUMMARY OF THE INVENTION

A method according to an embodiment of the invention includes fetching address translations for a current group of scanlines of image data and prefetching address translations for a next group of scanlines of image data. The prefetching occurs while the current group of scanlines of image data is being rendered on a display. The current group of scanlines and the next group of scanlines are the same size such that determining address translations for the next group of scanlines terminates at or before the time the current group of scanlines have been rendered on the display.

DETAILED DESCRIPTION OF THE INVENTION

Figure 1:
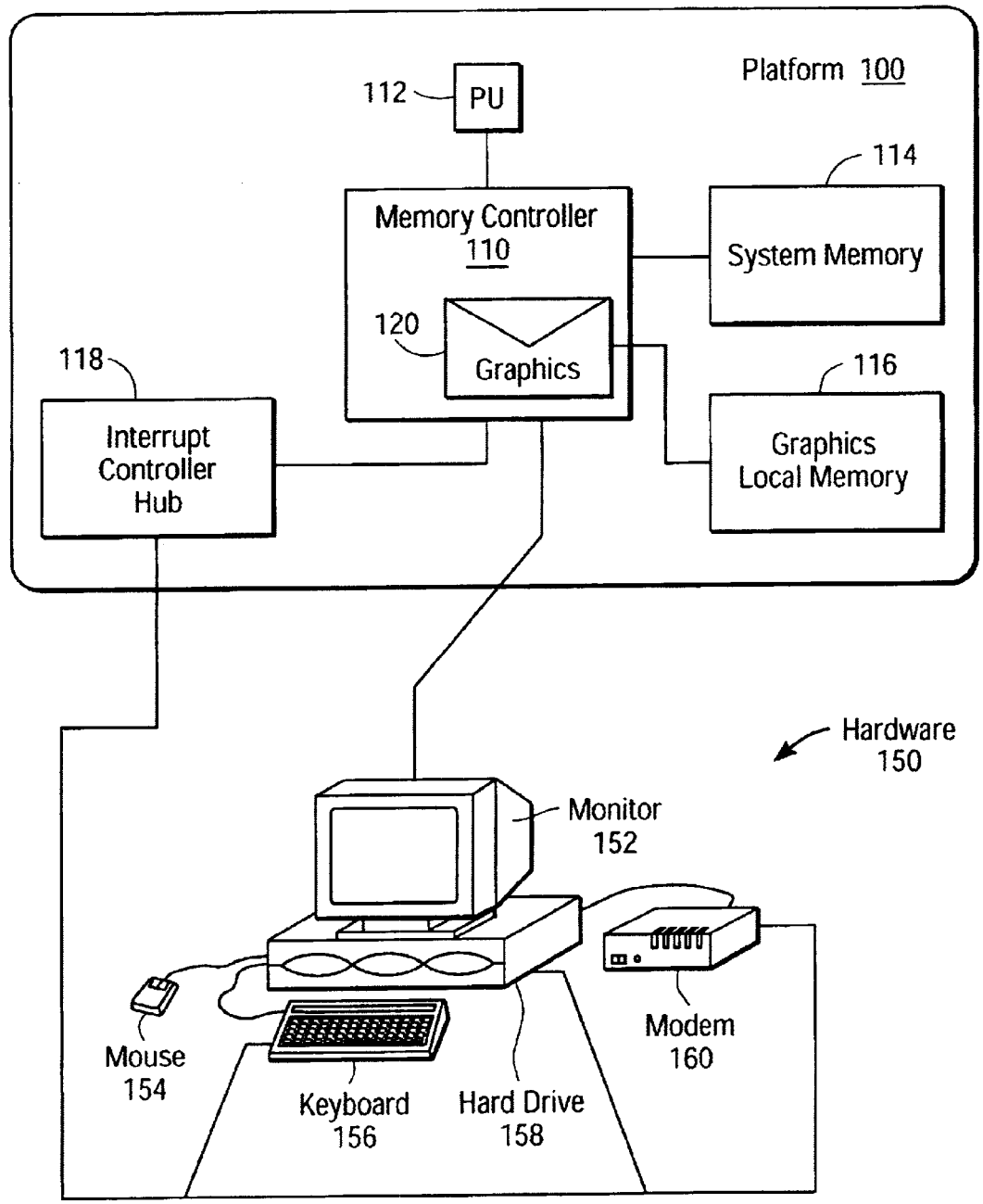
FIG. 1 illustrates platform 100 coupled to hardware 150.

FIG. 1 illustrates platform 100 coupled to hardware 150. Included within platform 100 may be memory controller 110 coupled to processing unit (PU) 112, system memory 114, graphics local memory 116, and interrupt controller hub 118. Platform 100 may be any combination of computer hardware and operating system.

Memory controller 110 may be responsible for performing fetch, decode, execute, and store commands on behalf of PU 112 by providing a direct interface between PU 112 and system memory 114. Memory controller 110 may fetch instructions from system memory 114 and decode these instructions to produce signals that control components within and outside platform 100.

Memory controller 110 may be a memory controller with integrated graphics 120. Integrated graphics 120 may be coupled to monitor 152 of hardware 150 through a video output port (not shown) of platform 100. Monitor 152 may be a cathode-ray tube and associated electronics that present images overlaying a background display either in monochrome (black and white) or color (e.g., red-green-blue (RGB)).

As a memory controller with integrated graphics, memory controller 110 may be capable of processing isochronous data streams as opposed to data packets which may be addressed and routed independently, possibly to multiple recipients. Isochronous transmission of data streams works to provide a certain minimum data rate, as required for time-dependent data such as video or audio. Isochronous transmission may transmit asynchronous data over a synchronous data link so that individual characters are only separated by a whole number of bit-length intervals. Asynchronous Transfer Mode and High Performance Serial Bus can provide isochronous service.

Processing unit (PU) 112 may be viewed as that part of platform 100 which controls all the other parts. System memory 114 may be a local physical memory to PU 112.

Graphics local memory 116 may be a fast physical memory designed for storing an image to be displayed on monitor 152. As a local frame buffer memory coupled to integrated graphics 120 of memory controller 110, graphics local memory 116 may be fast enough to supply data to the display electronics at the speed at which the screen of monitor 152 is scanned. For example, for a resolution of 1,280×1,024 eight-bit pixels at a refresh rate of seventy Hertz (Hz), graphics local memory 116 may need to supply ninety megabytes per second (Mbytes/s) (1,280*1,024*70), or one byte every eleven nanoseconds (ns). Graphics local memory 116 may be dual ported in order to allow the display electronics and PU 112 to simultaneously access graphics local memory 116 at the same time.

Interrupt controller hub (ICH) 118 may couple external hardware 150 such as mouse 154, keyboard 156, mass storage 158, and modem 160 to memory controller 110. Mouse 154 may be a computer input device used to manipulate an overlay pointer appearing on monitor 152 to select, move, and change items on monitor 152. Keyboard 156 may be a device consisting of a number of mechanical buttons (keys) that a user presses to input characters to platform 100. Mass storage 158 may include a hard disk drive used for non-volatile data storage as well as to receive isochronous data input. Modem 160 may be a modulator/demodulator communication device for converting between serial data from platform 100 and a tone signal suitable for transmission over telephone lines.

Figure 2:
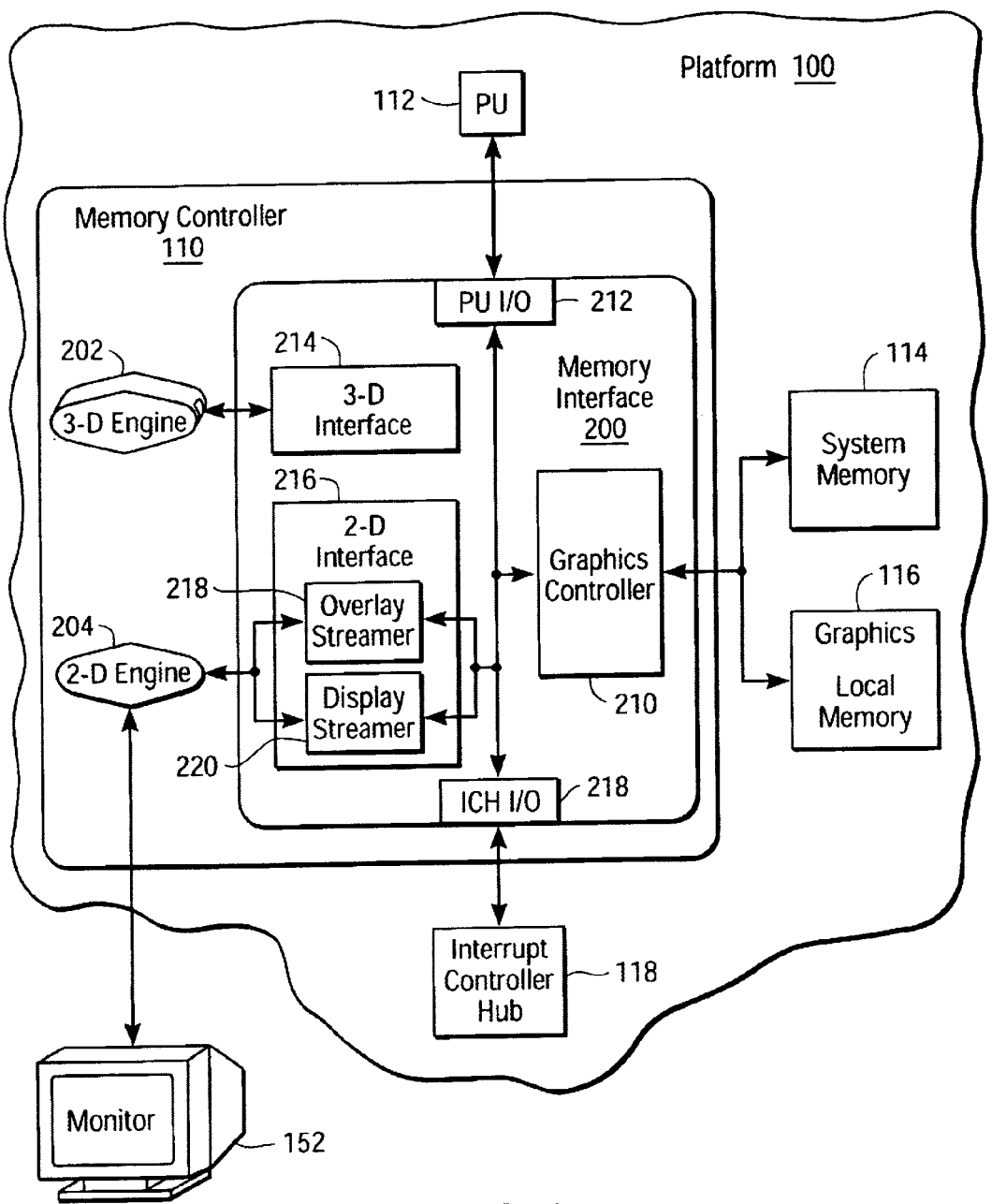
FIG. 2 is a detailed view of memory controller 110.

FIG. 2 is a detailed view of memory controller 110. Included within memory controller 110 may be memory interface 200, three-dimension (3D) engine 202, and two-dimension (2D) engine 204.

3D engine 202 may be additional hardware or software that performs graphics functions faster than is possible in software running on PU 112. As a graphics accelerator, 3D engine 202 may perform image rendering tasks such as receiving triangle data in three dimensions and, from this data, plotting lines and surfaces in two dimensions as well as perform fill, shade and hidden line removal tasks. This two dimension data may then be transmitted to system memory 114 or graphics local memory 116. 2D engine 202 may be an accelerator that retrieves the flat image results of 3D engine 202 from system memory 114 or graphics local memory 116 and displays the results of 3D engine 202 on monitor 152.

Memory interface 200 may include controller 210, PU input/output (I/O) port 212, 3D interface 214, 2D interface 216, and interrupt controller hub input/output port (ICH I/O port) 218. Controller 210 may be a graphics controller 210 when interacting with graphics local memory 116, or it may be a system controller 210 when interacting with system memory 114. PU input/output (I/O) port 212, 3D interface 214, and ICH I/O port 218 each couple their associated name-sake device to graphics controller 210. 2D interface 216 may further include overlay streamer 218 and display streamer 220. Overlay streamer 218 may address a graphical image moveable over background images provided by display streamer 220. An example of data worked by overlay streamer 218 may be Moving Pictures Experts Group (MPEG) encoded video received at monitor 152 from a camcorder or the Internet.

A pixel may be the smallest resolvable rectangular screen area of an image. A scanline may be a horizontal line of picture elements (pixels) generated by a single horizontal sweep of the beam from the electron gun of monitor 152. A frame may be one complete scan of the active area of a display screen.

Each frame may include a number of horizontal scanlines, N, on monitor 152, each of which may include a number of pixels, M. The number of pixels, M, that make up a frame may be viewed as the horizontal resolution, and the number of scanlines, N, that make up a frame may be viewed as the vertical resolution of the frame. The maximum number of pixels that can be displayed on a monitor may be expressed as the number of horizontal pixels and the number of vertical pixels, N×M. Popular examples include, 1,024×768 and 2,048×1536. The ratio of horizontal to vertical display resolution is typically four to three (4:3) (the same as that of conventional television sets).

In operation, 2D engine 204 may transmit to either overlay streamer 218 or display streamer 220 a request for data to be displayed on monitor 152 by sending a list of virtual addresses with which the physical data is associated. The data request from 2D engine 204 may be presented to either overlay streamer 218 or display streamer 220 as a bulk request for an entire scanline on the screen of monitor 152.

In a preferred embodiment of the invention, each pixel is represented by two bytes (sixteen bits) of data. Thus, a 2D engine request for one scanline of data when the display has a 640×200 resolution requires 1,280 bytes of information (640*2). For a 1,024×768 resolution display, a 2D engine request for one scanline of data requires 2,048 bytes of information (1,024*2). Similarly, or a 2,048×1536 resolution display, 4,096 bytes are required (2,048*2).

Figure 3:
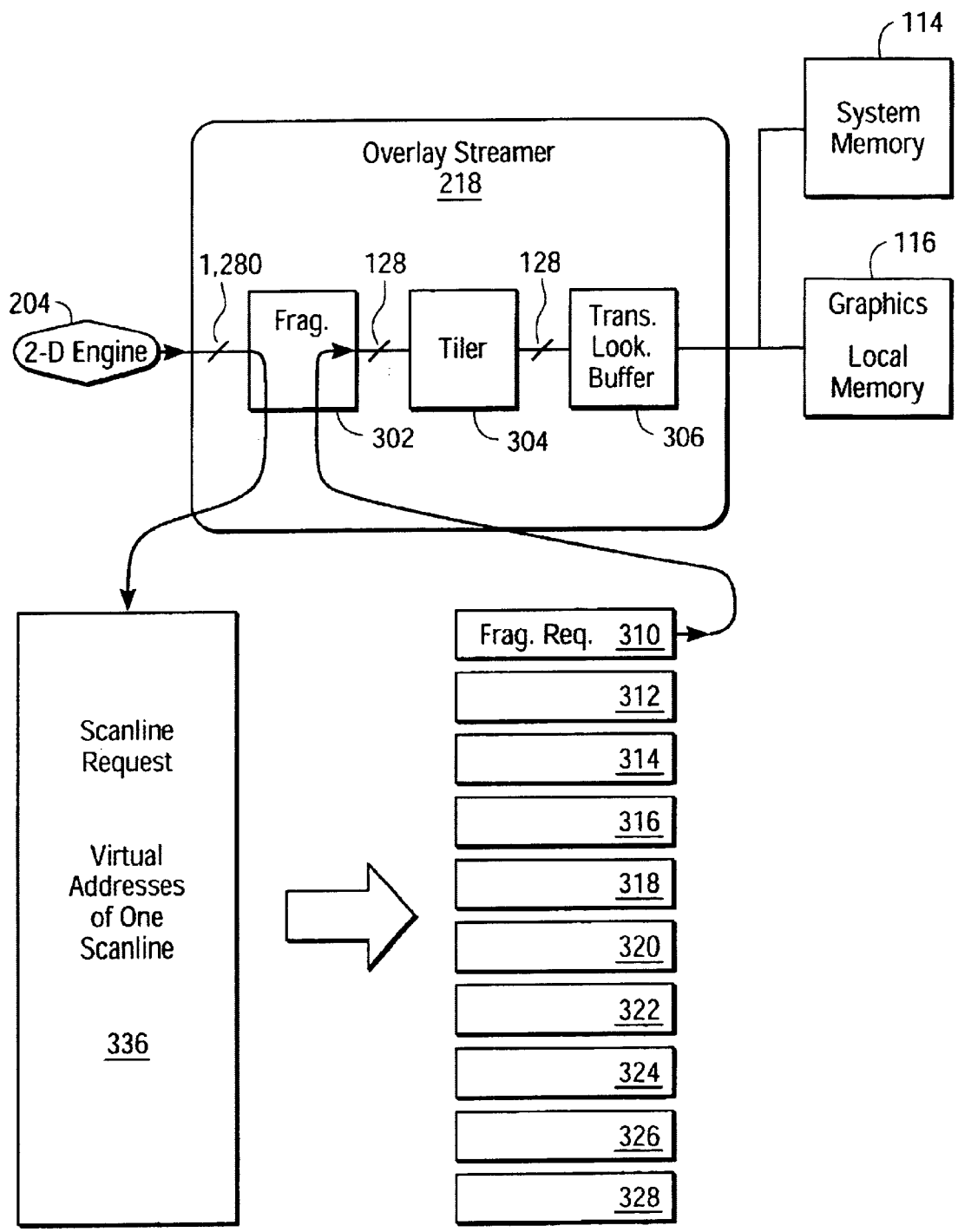
FIG. 3 is a detailed view of overlay streamer 218.

FIG. 3 is a detailed view of overlay streamer 218. The components of overlay streamer 218 are similar to the components of display streamer 220. However, display streamer 220 may include additional software to support legacy video graphics array (VGA) compliant displays. This discussion of overlay streamer 218 generally applies to display streamer 220.

Overlay streamer 218 may include translation look-aside buffer 306, fragmenter 302 and tiler 304. Fragmenter 302 may break up the request from 2D engine for the following reasons. Recall that a 640×200 resolution requires 1,280 bytes of information per scanline. On receiving bulk scanline data request from 2D engine 204, fragmenter 302 may fragment this virtual address request into byte requests that memory controller 110 can handle. For example, where memory controller 110 handles requests for 128 bytes of information at a time, fragmenter 302 may divide a scanline request 336 into fragmented requests 310, 312, 314, 316, 318, 320, 322, 324, 326, and 328 and sequentially transmit each of these ten fragment requests to tiler 304.

As shown in FIG. 3, fragmenter 302 may transmit the 128 byte fragment request 310 to tiler 304. 2D engine 204 may perceive that the requested data is stored in physical memory in the same way as presented on monitor 152, namely as rows of memory divided into columns. However, 3D engine 202 may perceive that data is stored in physical memory as columns of memory divided into rows. Thus, 2D engine 204 may formulate data requests that read across graphics local memory/physical memory 116 while 3D engine 202 may formulate data requests that read down physical memory 116. To resolve these two different perceptions, data addresses may be presented in long rows from the view of 2D engine 204, and presented in tiles having short rows from the view of graphics local memory 116. Tiler 304 may be used to map the long row data addresses from the 2D engine 204 to the tiles having short rows for use by graphics local memory 116.

Figure 4:
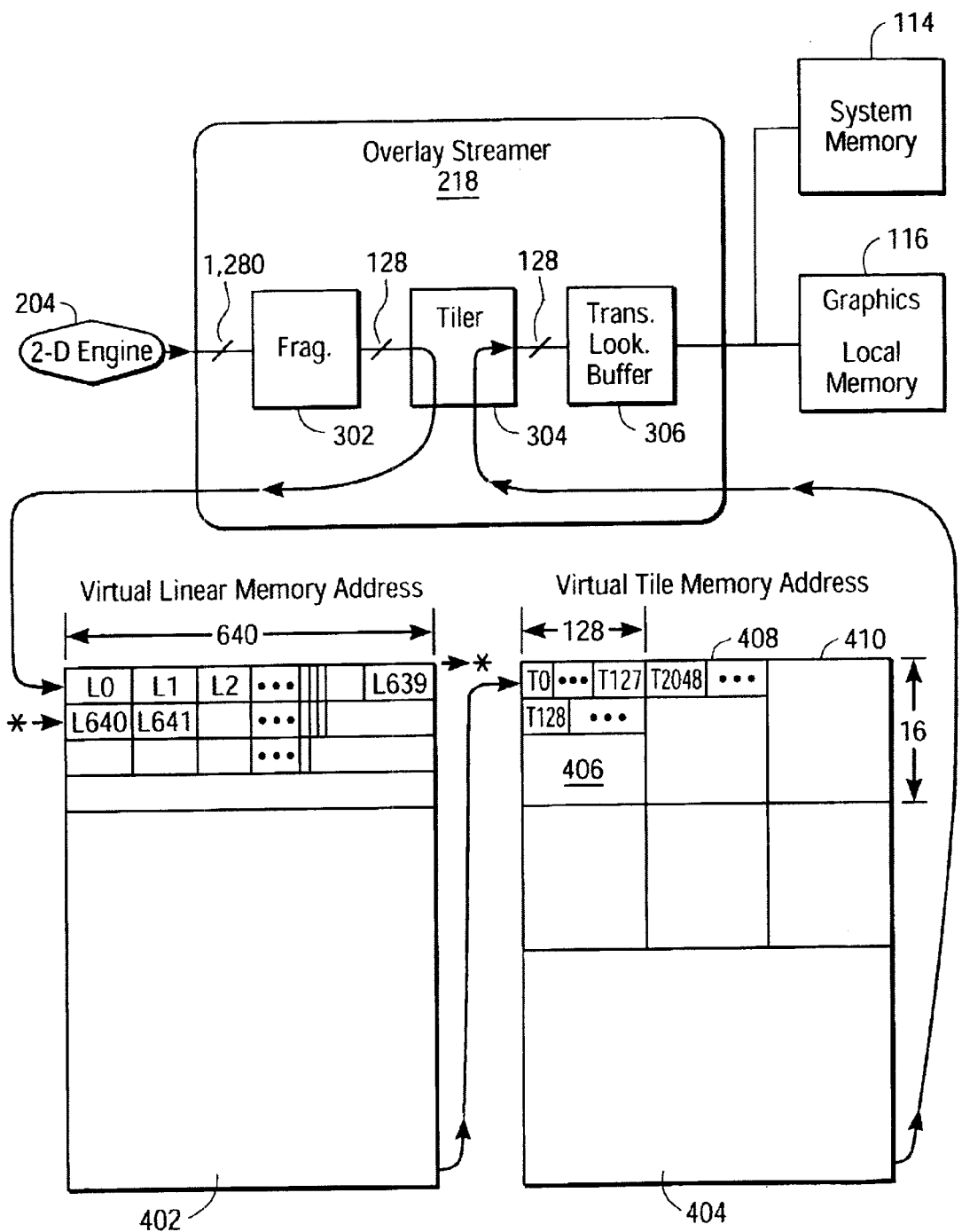
FIG. 4 illustrates the operation of tiler 304.

FIG. 4 helps illustrate the operation of tiler 304. Referring momentarily to FIG. 3, fragment request 310 may include a virtual address. The virtual address may indicate the starting location of the requested data and the length of the requested data. In the above example, the length of each of the 10 requested data fragments is 128 bytes. As the first of ten requests, the starting location of the requested data may be L0 shown in FIG. 4. Since the requested data fragments are 128 bytes wide, the location of fragmented request 310 in virtual linear memory address space 402 may span from L0 to L127. The location of the next fragmented request 312 of FIG. 3 in virtual linear memory address space 402 may span from L128 to L255. In another embodiment in which each row in virtual linear memory address space 402 is 640 columns wide, the location of scanline request 306 (requesting 1,280 bytes of data for a 640 pixel wide scanline), is in the first two rows of virtual linear memory address space 402 (from L0 to L1279).

As each request enters tiler 304, tiler 304 may map the virtual linear memory address location to the associated location within virtual tile memory address space 404. Referring again to an embodiment of the invention with a 128 byte wide request fragment, for fragmented request 310 within L0 to L127, tiler 304 may map this location from T0 to T127 in virtual tile memory address space 404. For fragmented request 312 within L128 to L255, tiler 304 may map this location from T2048 to T2175 (L256 to L383 may get mapped to T4096 to T4223). When each row in tile 406 of virtual tile memory address space 402 is 128 bytes wide, the location of scanline request 306 (1,280 bytes for a 640 pixel wide scanline) is the first ten rows of virtual tile memory address space 404, from L0 to L1279 (1,280= 10*128). By assigning sixteen rows to each 128 byte wide tile, each tile of virtual tile memory address space 402 retains 128 bytes from each of sixteen scanlines of addresses for a 1,024×768 resolution. In alternative embodiments, each tile of virtual tile memory address space 404 may be divided into any number of columns and rows, taking into account the resolution of each monitor likely to be connected to platform 100.

Figure 5:
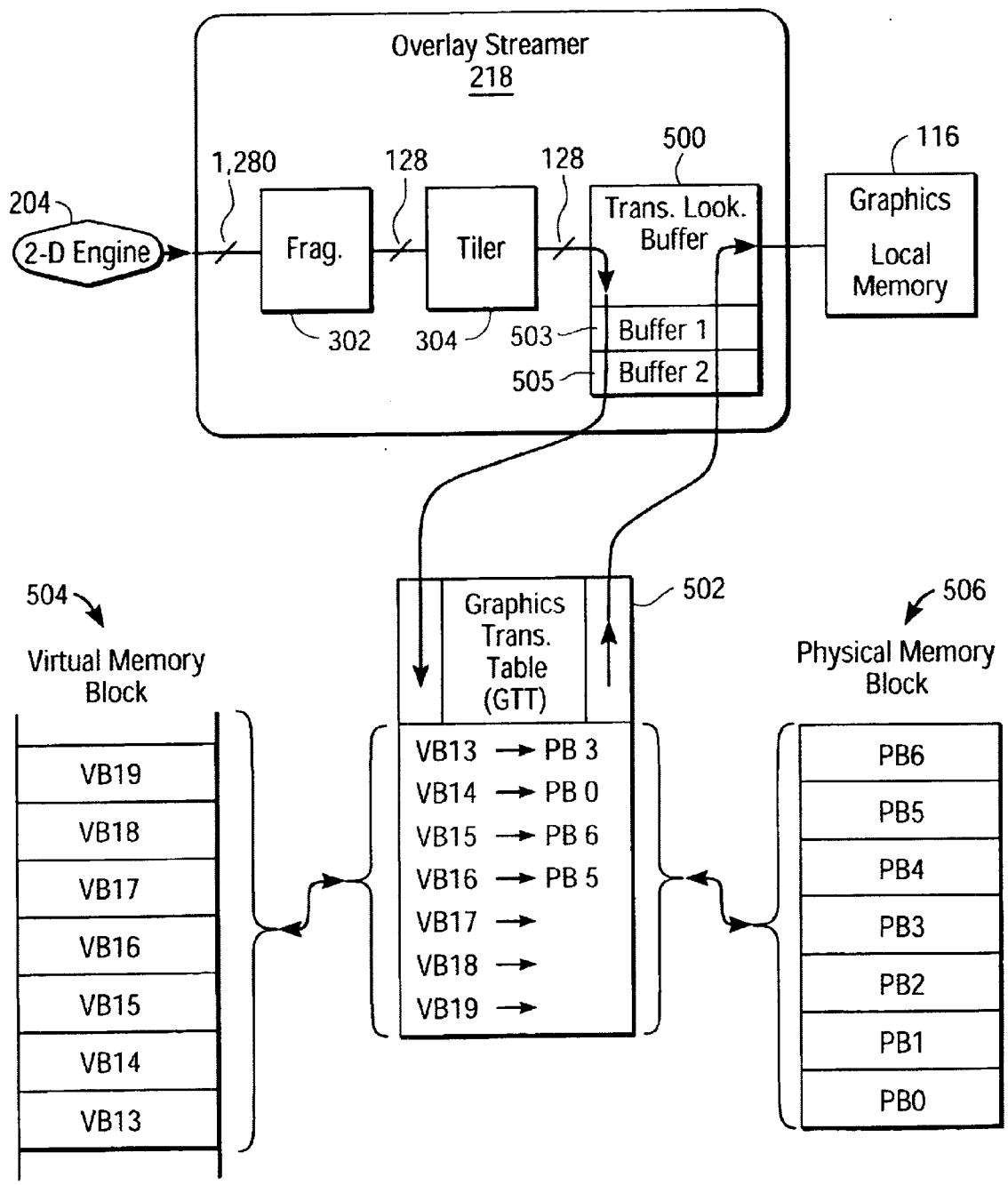
FIG. 5 illustrates an embodiment of translation look-aside buffer (TLB) 500.

After mapping fragmented request 310 to the appropriate addresses within virtual tile memory address space 404, tiler 304 may pass the request to translation look-aside buffer 306. FIG. 5 helps illustrate an embodiment of the invention that features a translation look-aside buffer (TLB) 500. Included within TLB 500 may be graphics translation table 502. Graphics translation table 502 may store prefetched and fetched address translations of virtual memory block 504 to physical memory block 506. A memory block may include pixel data for one or more tiles, where a tile may include sixteen rows with each row having 128 bytes. As is discussed below, virtual memory block 504 and physical memory block 506 may store data for two tiles.

Fetching virtual to physical address translations adds latency to an isochronous data stream. To minimize the effect of TLB fetch latency on an isochronous data stream, an embodiment of the invention employs a low latency TLB management policy for fetching TLB translations. The policy employs prefetch; that is, TLB 500 may fetch the TLB translations before 2D engine 204 requests the translations, and, thus, before the electronic gun needs the translations. In this embodiment, each prefetched translation resides within graphics translation table 502 prior to being requested by 2D engine 204. Since the TLB translations have been prefetched, latency will not be added to a request from 2D engine 204 for a new TLB translation.

One aspect of this embodiment of the invention is predicting in advance those TLB translations that will be requested by the 2D engine 204. Certain data streams are deterministic. For example, isochronous data streams are deterministic because their memory access patterns are based on the pattern the electronic gun uses to activate the pixels of monitor 152. Conventionally, an electronic gun sweeps horizontally from the first column along the first row, drops to the second row, returns to the first column, then sweeps horizontally along the second row. The electronic gun may repeat this pattern until the pixels of each row have been activated. The electronic gun may then return to row one, column one and start the process over. Other sweep patterns are preestablished as well.

Figure 6:
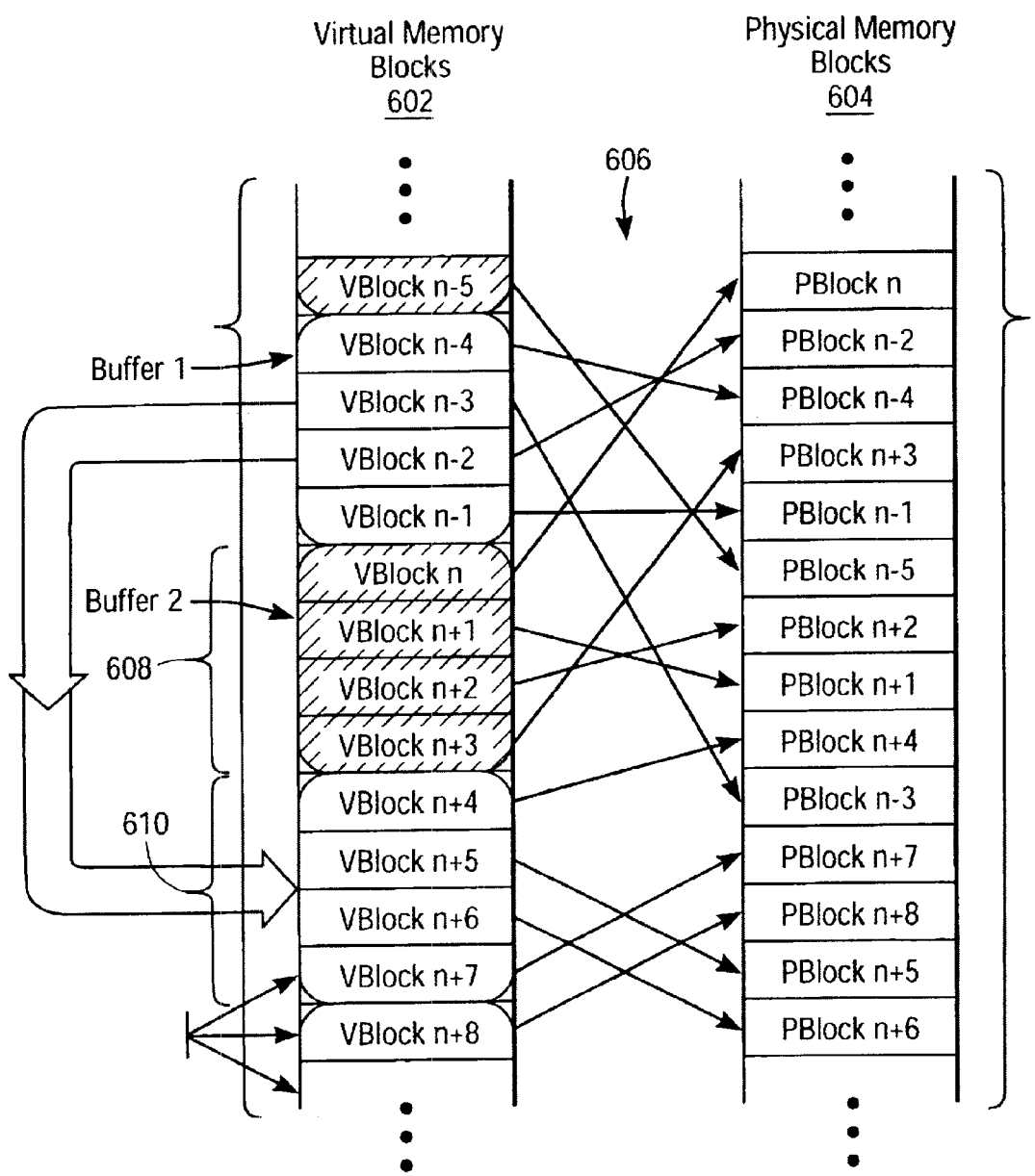
FIG. 6 illustrates address mapping between virtual memory block 602 and physical memory block 604.

An embodiment of the invention divides the buffers of TLB 500 into two sets of buffers 503, 505. FIG. 6 illustrates address mapping between virtual memory block 602 and physical memory block 604. Virtual memory block 602 may contain the data for an isochronous stream with blocks in a predetermined order. Physical memory block 604 may contain the allocated blocks for the isochronous stream with the blocks not in a predetermined order. Mapping is shown by arrows 606.

Buffer 1 may include four blocks and buffer 2 may include four blocks. At a given time, the state of buffer 1 will either be in use or not in use, and buffer 2 will be in the state other than the state of buffer 1. While the isochronous stream is using the set of translations prefetched and stored in buffer 2 at set 608, buffer 1 prefetches the next set of translations and stores them at set 610. Thus, the next set of translations will be available to 2D engine 204 before being requested by 2D engine 204. When the set of translations at set 608 are no longer in use, set 608 can be written over with a new set of translations. The writing of translations into set 608 of a virtual memory block can occur while the isochronous stream is actively using the translations in, for example, set 610.

To ensure that there are enough translations within each buffer to prevent a request from 2D engine 204 to refer to translations from both buffers, each buffer should include a minimum number of translations. In other words, there should be enough translations within a set such that the isochronous stream request is fully contained within that set of translations for a given period of time. In this way, while buffer 1 is in use, buffer 2 may be updated with the translations that will be needed when buffer 1 is no longer in use. While buffer 2 is in use, buffer 1 may be updated. By leap-frogging from one buffer to the other buffer, all of the translations will be available before the isochronous stream needs them.

In an embodiment of the invention, the virtual to physical address translations are fetched and placed in one of the buffers before the translations are needed. In a particular embodiment, only a minimum number of translations are fetched. This assures that, for the current scanline being displayed, all the translations for the pixels on that scanline are within the buffer prior to being requested. The minimum number of prefetched translations is a function of the memory organization of the isochronous stream. The maximum number of prefetched translations may be the whole screen.

Figure 7:
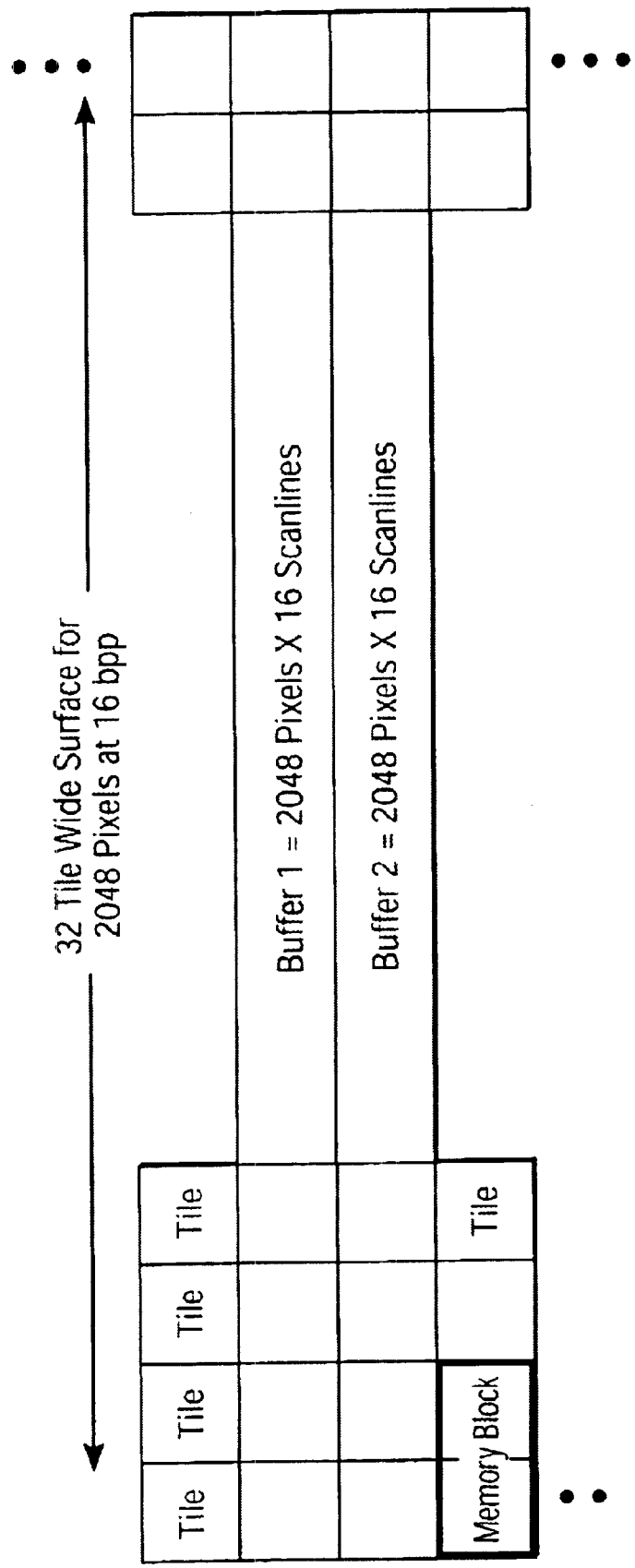
FIG. 7 illustrates a thirty two tile wide surface for 2,048 pixels at 16 bits per pixel (bpp)

In an embodiment of the invention, the method prefetches sixteen scanlines as the minimum number of translations for a small screen size. For example, assume the screen resolution is 2,048×1,536, and each of the 2,048 pixels in a scanline requires 2 bytes per pixel. Moreover, assume that the display surface organization is tiled with 2,048-byte (2 KB) tiles (each tile is 128 bytes wide×16 rows, as opposed to linear). Thus, one tile only provides enough space to store references to an area on the surface of a monitor that totals 1,024 pixels, that is 64 pixels wide by 16 rows high. As such, thirty-two tiles are required to represent one scanline when the screen resolution is 2,048×1,536. Therefore, in this embodiment, to represent 16 scanlines, 32 tiles are needed. By assigning sixteen rows to each 128 byte wide tile, each tile of a virtual tile memory address stores a portion from each of sixteen scanlines of addresses for 1,024×768 resolution (that is: 1,204 pixels*2 bytes per pixel=2,048 bytes= 16 rows*64 pixels per row*2 bytes per pixel). That is, a 2 KB tile references an area on the surface of a monitor that equals 1,024 pixels. However, the number of tiles needed for one scanline for 2,048×1,536 resolution is thirty-two tiles as 2,048 pixels*2 bytes per pixel=4,096 bytes or 4 KB. Thus, a 4 KB memory block required to represent 2,048×1,536 resolution may be organized within two horizontally aligned tiles. That is, for every thirty-two 2 KB tiles, one translation for a 2,048 pixel wide resolution is provided. In this embodiment, 32 tiles are required to represent 16 scanlines. This can also be described as 16 pairs of tiles. FIG. 7 illustrates a 32 tile wide surface for 2,048 pixels at 16 bits per pixel (bpp) representative of this embodiment.

In a preferred embodiment of the invention, a screen surface may be aligned to a power of two horizontal tiles in memory. In an embodiment with a thirty two tile wide area illustrated in FIG. 7, each translation buffer maintains at least sixteen scanline translations. Since a tile is sixteen rows high, the display surface of a monitor to which a buffer maps will be 2,048 pixels by sixteen rows. This ensures that as one buffer is being used, enough time will be available for TLB 500 to prefetch sixteen more scanline translations into the other buffer. The size of the buffer is generally large enough to hold address translations for at least the number of scanlines corresponding to the height of the tiles. In a preferred embodiment, this is 16 scanlines as the tiles have 16 rows.

In a preferred embodiment of the invention, when the screen resolution is less than 2,048×1,536, a buffer will accommodate more scanlines of the display surface, and TLB 500 will have more time to prefetch the translations. For example, for a resolution of 1,024 pixels wide, thirty two scanlines may be stored in each buffer. In general, the minimum size of each buffer equals the size of the request output from fragmenter 302 (see FIG. 4 momentarily). If memory controller 110 can only handle requests for 128 bytes of information at a time, such that the output requests from fragmenter 302 are requests for 128 bytes of information, then each buffer would need to handle a minimum of 128 bytes of information. This allows 128 bytes of information from buffer 1 to be in use by a first request from fragmenter 302, and buffer 2 can retrieve 128 bytes of information in advance of a second request from fragmenter 302.

When rendering a typical image on a monitor, buffer 1 and buffer 2 will leap-frog each other in a forward (downscreen) manner. An overlay surface can be displayed such that the picture is flipped horizontally, vertically, or both horizontally and vertically. As such, for a TLB performing translations for an overlay surface, a leap-frog will occur in an upscreen manner.

Figure 8:
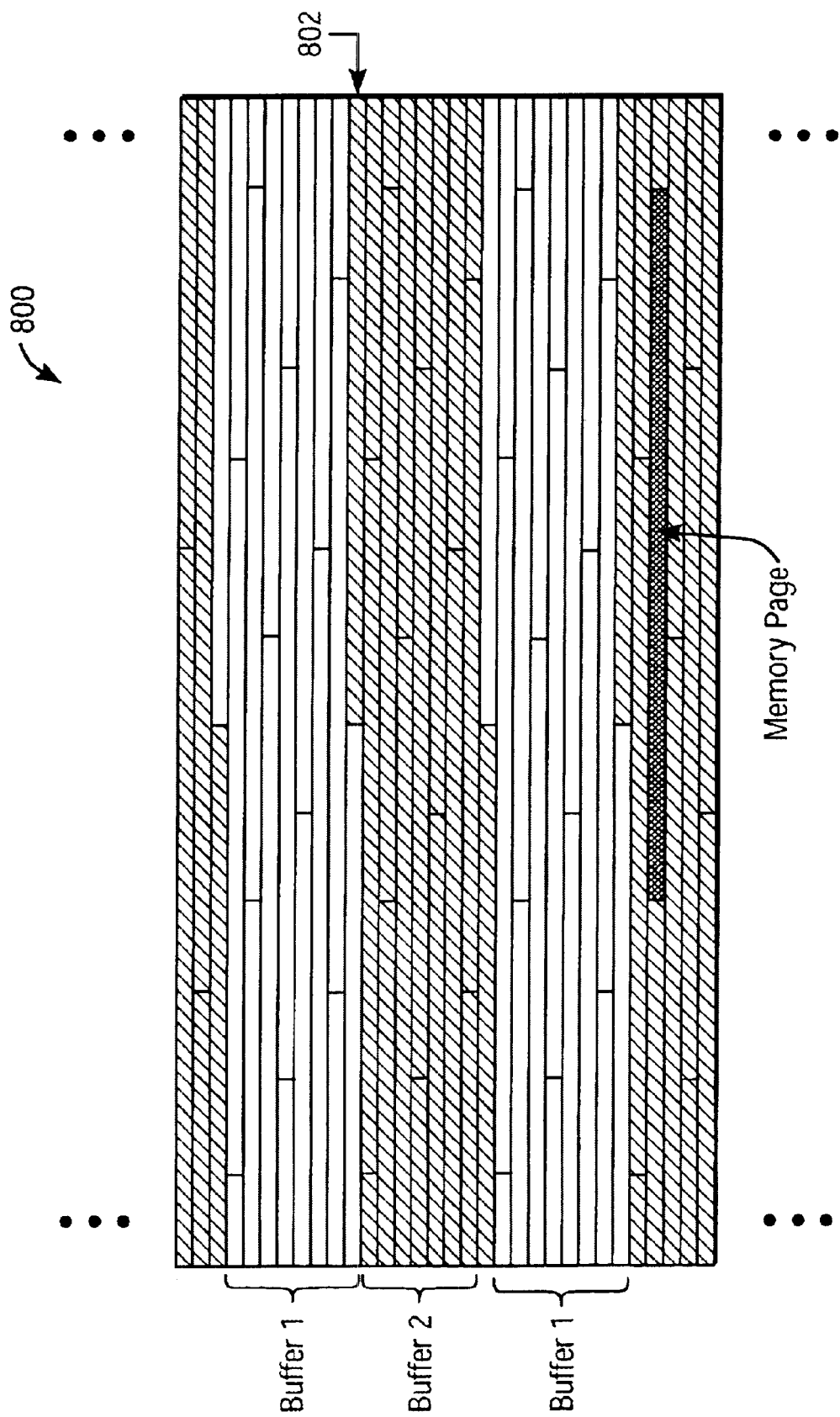
FIG. 8 illustrates a flipped overlay surface of a linear surface memory.

FIG. 8 illustrates a flipped overlay surface of a linear surface memory. Where the picture is flipped, the TLB needs to prefetch translations in the opposite direction than typically fetched for a display surface. For example, assume that data is stored using linear memory organization 800 and that a surface has been flipped horizontally. In a linear memory organization, pages may not line up as in a tiled memory organization (FIG. 7). Thus, a TLB fetches forward (downscreen), but does not always leap-frog in the same direction.

There are special cases that deal with the overlay streamer fetching patterns when the surface is flipped horizontally or vertically. When flipped once horizontally, the order of leap-frogging may be the same (downscreen) but the initial fetch fetches and buffer <n> (required for the first address) and buffer <n−1> (because the first scanline may cross two buffers). Thus, the first fetch may be fetched upscreen and them after that point, leap-frogging goes downscreen. When flipped once vertically, the first fetch may be fetched downscreen and them leap-frogging goes upscreen after that point. When flipped both horizontally and vertically, leap frogging may go upscreen but there is not a special initial fetch.

Start pixel 802 of surface 800 is located in buffer 2. Buffer 1 may be prefetched downscreen of the first fetch. The entire first scanline is split between the translations in buffer 2 as well as those translations that are waiting to be prefetched. In this way, surface 800 is trying to hide those translations that are waiting to be prefetched. Since the first scanline is split, those translations that are waiting to be prefetched would need to be fetched when the pixel data is needed. Thus, those translations that are waiting to be prefetched would incur the TLB latency.

In another embodiment, TLB 500 prefetches backwards (upscreen) when an image has been flipped. In this embodiment, as soon as the first scanline is read, the old translations are discarded and buffer 1 is then loaded with the downscreen set of translations. This first backwards translation will occur when memory organization is represented linearly and the surface is displayed in a vertically and/or horizontally flipped mode.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. An apparatus comprising:
    a bus;
    a memory coupled to the bus;
    a processor coupled to the bus;
    a display coupled to the bus;
    a translation look-aside buffer (TLB) to receive fetched address translations for a current group of scanlines of image data and prefetched address translations for a next group of scanlines of image data concurrently with the current group of scanlines of image data being rendered on the display.

2. The apparatus of claim 1 wherein the TLB comprises: a first buffer and a second buffer such that when one of the first buffer and the second buffer stores address translations for the current group of scanlines of image data, the other of the first buffer and the second buffer stores address translations for the next group of scanlines of image data.

3. The apparatus of claim 2 wherein the first buffer and the second buffer are each large enough to hold address translations to at least 16 scan lines of image data.

4. The apparatus of claim 2 wherein the first buffer and the second buffer are the same size and are each large enough to hold address translations such that determining address translations for the next group of scanlines terminates at or before the time the current group of scanlines have been rendered on the display.

5. The apparatus of claim 1 wherein the address translations for the current group of scanlines of image data and the address translations for the next group of scanlines of image data map from a virtual address space to a physical address space.

6. The apparatus of claim 5 wherein the virtual address space is linearly addressed and the physical address space is addressed by tiles.

7. The apparatus of claim 6 wherein the tiles are each large enough to hold at least one scanline of image data.

8. The apparatus of claim 6 wherein the tiles are 128 bytes wide and 16 rows high such that each tile holds 2 kilobytes (KB) of image data.

9. The apparatus of claim 6 wherein the image data is aligned to a 32 tile wide area in the physical address space.

10. The apparatus of claim 6 wherein the tiles are aligned in horizontal pairs.

11. The apparatus of claim 6 wherein the first buffer and the second buffer are identical in size and each is large enough to hold address translations for a number of scanlines corresponding to a height of the tiles.

12. The apparatus of claim 1 wherein the image data is isochronous data.

13. A method comprising:
fetching address translations for a current group of scanlines of image data; and
prefetching address translations for a next group of scanlines of image data concurrently with the current group of scanlines of image data being rendered on a display, wherein determining address translations for the next group of scanlines terminates at or before the time the current group of scanlines have been rendered on the display.

14. The method of claim 13 further comprising:
storing the address translations for the current group of scanlines of image data in one of a first buffer and a second buffer; and
storing the address translations for the next group of scanlines of image data in one of the first buffer and the second buffer such that when one of the first buffer and the second buffer stores address translations for the current group of scanlines of image data, the other of the first buffer and the second buffer stores address translations for the next group of scanlines of image data.

15. The method of claim 13 wherein prefetching further comprises:
mapping the address translations for the next group of scanlines of image data from a virtual address space to a physical address space.

16. The method of claim 13 wherein the virtual address space is linearly addressed and the physical address space is addressed by tiles.

17. The method of claim 16 wherein the tiles are each large enough to hold at least one scanline of image data.

18. The method of claim 16 wherein the tiles are 128 bytes wide and 16 rows high such that each tile holds 2 kilobytes (KB) of image data.

19. The method of claim 16 wherein the image data is aligned to a 32 tile wide area in the physical address space and the tiles are aligned in horizontal pairs.

20. The method of claim 16 wherein the first buffer and the second buffer are each large enough to hold address translations for a number of scanlines corresponding to the height of the tile.

21. The method of claim 16 wherein the first buffer and the second buffer are each large enough to hold address translations to at least 16 scanlines of image data.

22. The method of claim 13 wherein prefetching address translations for a next group of scanlines of image data further comprises:
determining whether the next group of scanlines should be prefetched in a forward direction or a backward direction responsive to whether the image has been flipped vertically or horizontally.

23. An article of manufacture comprising:
a machine readable medium having stored thereon instructions which when executed by a processor cause the processor to
fetch address translations for a current group of scanlines of image data; and
prefetch address translations for a next group of scanlines of image data, including mapping the address translations for the next group of scanlines of image data from a virtual address space to a physical address space, concurrently with processing the current group of scanlines of image data.

24. The article of manufacture of claim 23 wherein the machine readable medium has stored thereon further instructions further causing the processor to:
determine whether the next group of scanlines should be prefetched in a forward direction or a backward direction responsive to whether the image has been flipped vertically or horizontally.

25. The article of manufacture of claim 23 wherein the machine readable medium has stored thereon further instructions causing the processor to
store the address translations for the current group of scanlines of image data in one of a first buffer and a second buffer; and
store the address translations for the next group of scanlines of image data in one of the first buffer and the second buffer such that when one of the first buffer and the second buffer stores address translations for the current group of scanlines of image data, the other of the first buffer and the second buffer stores address translations for the next group of scanlines of image data, and
the first buffer and the second buffer are large enough wherein mapping the address translations for the next group of scanlines terminates at or before the time the current group of scanlines have been rendered on a display.

26. A translation look-aside buffer comprising:
means for fetching address translations of a current group of scanlines of image data;

means for distributing the current group of scanlines of image data as rendered data; and means for prefetching address translations of a next group of scanlines of image data while the current group of scanlines of image data is being distributed.

27. The translation look-aside buffer of claim 26, wherein the means for fetching and the means for prefetching include a first buffer and a second buffer such that when one of the first buffer and the second buffer stores address translations for the current group of scanlines of image data, the other of the first buffer and the second buffer stores address translations for the next group of scanlines of image data.

28. The translation look-aside buffer of claim 26, wherein the address translations for the current group of scanlines of image data and the address translations for the next group of scanlines of image data map from a virtual address space to a physical address space.

* * * * *